Figure 1:
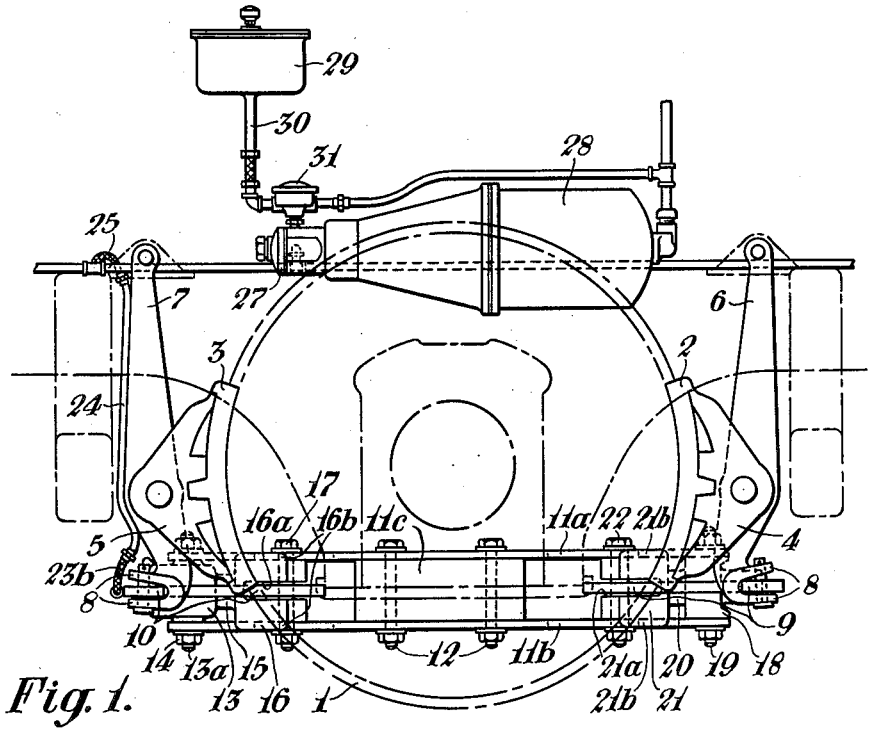

Feb. 27, 1951   T. R. McGOWAN   2,543,326
CLASP BRAKE MECHANISM
Filed June 23, 1948   2 Sheets-Sheet 1

INVENTOR.
Thomas R. McGowan
BY
HIS ATTORNEY

Patented Feb. 27, 1951

2,543,326

UNITED STATES PATENT OFFICE 2,543,326

CLASP BRAKE MECHANISM

Thomas R. McGowan, St. Louis, Mo., assignor to The American Brake Company, Swissvale, Pa., a corporation of Missouri Application June 23, 1948, Serial No. 34,610

6 Claims. (Cl. 188—56)

My invention relates to brake mechanism, and especially to mechanism for operating the brakes on a railway vehicle such as a locomotive.

Brake shoes for railway locomotives are commonly operated by pneumatic motors or cylinders which operate the brake shoes through force multiplying levers and linkages. The braking force required on a locomotive depends, among other things, upon the weight of the locomotive and the speed at which it is to be operated. There is at present a tendency to increase both the speed and the weight in the design of new locomotives. The resulting requirements for increased braking forces mean either that the pneumatic cylinders which operate the brakes must be increased in size and power, or that the force multiplying linkages between the cylinders and the brakes must be changed to increase their mechanical advantage. Such a change in a force multiplying linkage of course means that the linkage must be larger. However, the increase in speed and weight of the locomotive has also resulted in changes in the truck design which leaves less space available than heretofore for the brake operating mechanism. It is therefore becoming increasingly difficult to provide the required braking forces with conventional pneumatic cylinders and mechanical linkages.

It has been proposed to operate the brake shoes on a locomotive by means of hydraulic cylinders to be supplied with hydraulic fluid at extremely high pressures from a ram or accumulator operated by a single large pneumatic cylinder. In such an arrangement, the force multiplying mechanism becomes quite simple, and the connection between the accumulator and the various hydraulic cylinders can be made by means of pipes and tubes which require relatively small space as compared to a mechanical linkage.

It is therefore an object of my invention to provide an improved hydraulic mechanism for operating the brakes of a locomotive.

Another object is to provide an improved and simplified clasp brake rigging for a railway vehicle.

Another object is to provide, in a hydraulic brake system of the type described, an improved supporting arrangement for the conduits connecting the source of hydraulic fluid with the several hydraulic cylinders.

My invention is illustrated herein as applied to a locomotive truck having clasp brakes including conventional brake shoes, brakeheads, and brake hanger levers. Two modifications of my invention are illustrated.

In the first modification, the lower end of each hanger lever is connected by a brake beam to the corresponding hanger lever on the opposite side of the truck. The two brake beams associated with each wheel are connected by means of a pull rod located inside and parallel to the wheel. One end of the pull rod is connected to the adjacent brake beam by means of a hydraulic motor which is effective when supplied with hydraulic fluid under pressure to cause relative movement of the brake beam and the pull rod. The other end of the pull rod is connected to its adjacent brake beam by means of a conventional slack adjuster arrangement. Hydraulic fluid is supplied to the hydraulic motor through a pipe which is rigidly attached to the brake hanger lever and extends lengthwise thereof. A flexible conduit connects the upper end of this pipe to a source of hydraulic fluid located on the frame of the truck or locomotive. The lower end of the pipe is connected through another flexible conduit to the hydraulic motor.

In the second modification of my invention illustrated herein, the brakes on the opposite sides of the truck are not interconnected by brake beams. The two brake hanger levers on opposite sides of each wheel are connected by means of straddle rods. The straddle rods are connected at one end to the adjacent brake hanger lever through a hydraulic motor, and at the other end to the other brake hanger lever through an automatic slack adjuster which is also operated hydraulically. Hydraulic fluid is supplied to the motor in the same manner as in the first modification of my invention. Hydraulic fluid is supplied from the motor to the slack adjuster through a pipe which is rigidly attached to one of the straddle rods and flexible conduits connecting the ends of the pipe respectively to the motor and to the automatic slack adjuster.

Other objects and characteristic features of my invention will become apparent as the description proceeds.

I shall illustrate and describe herein two forms of brake mechanism embodying my invention, and shall then point out the novel features thereof in claims.

Figure 2:
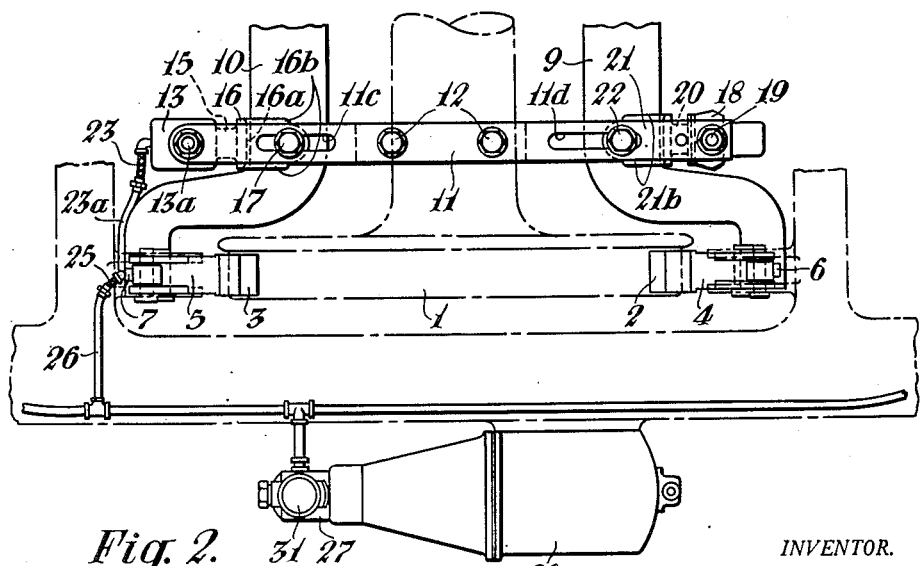
Figure 3:
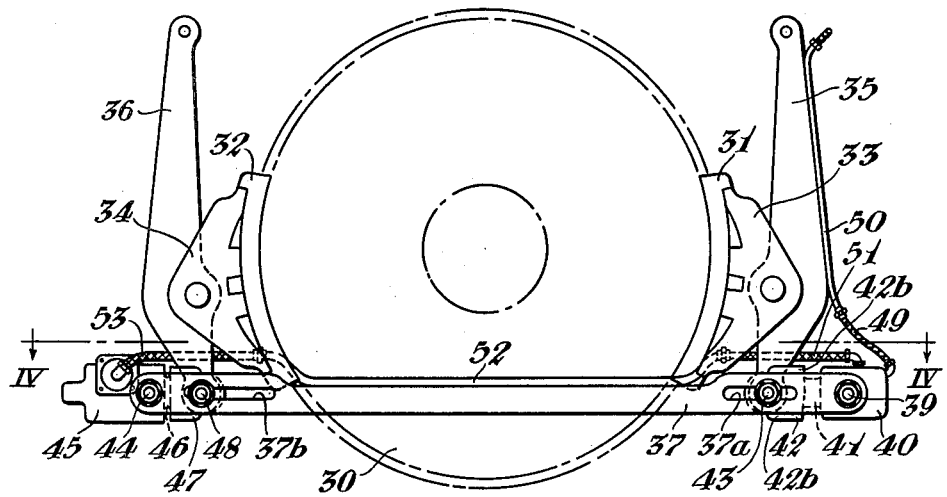
Figure 4:
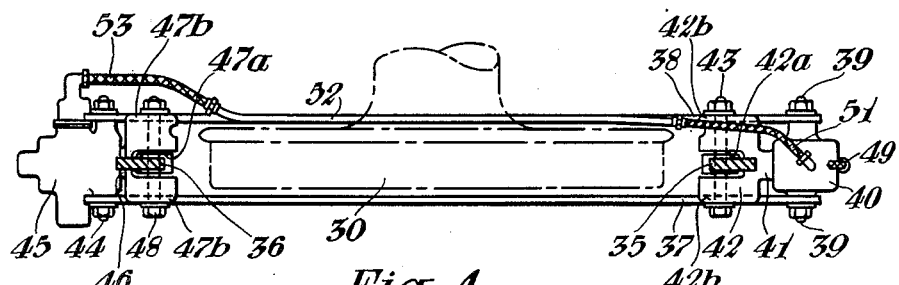

In the accompanying drawings, Fig. 1 is a side elevational view of one end of a locomotive wheel and axle assembly equipped with brake mechanism embodying my invention. Fig. 2 is a top plan view of the brake mechanism of Fig. 1. Fig. 3 is a side elevational view of a locomotive wheel and axle assembly equipped with brake mechanism embodying another modification of my invention. Fig. 4 is a sectional view of the brake mechanism of Fig. 3, taken on the line IV—IV of Fig. 3, looking in the direction of the arrows.

Referring to Figs. 1 and 2, there is shown one end of a wheel and axle assembly provided with brake rigging according to my invention. The other end of the assembly, not shown, is provided with symmetrical brake rigging which is the counterpart of that shown here. In the drawings, a wheel 1 is provided with brake shoes 2 and 3 at opposite sides thereof. The brake shoes 2 and 3 are carried by brakeheads 4 and 5, respectively, which are in turn supported by hanger levers 6 and 7 pivotally attached at their upper ends to the locomotive frame in a conventional manner. The lower ends of the hanger levers 6 and 7 are provided with spaced jaws 8 to receive the ends of brake beams 9 and 10 in a well-known manner.

The brake beams 9 and 10 are connected by means of a pull rod or tension rod 11. As shown in Fig. 1, the tension rod 11 comprises upper and lower straps 11a and 11b fastened by bolts 12 to the opposite sides of a spacer block 11c. The brake beams 9 and 10 have their ends offset so that their central portions lie in lateral alignment with the wheel 1. The straps 11a and 11b are elongated to extend beyond the brake beams 9 and 10. A hydraulic motor 13 is received between the ends of the straps 11a and 11b adjacent the brake beam 10. The motor 13 is provided with trunnions 13a which project through holes in the straps 11a and 11b and are threaded to receive nuts 14 which hold the motor in place on the straps. The motor 13 includes a piston (not shown) which operates a piston rod 15 to which is attached a clevis block 16. The clevis block 16 is slotted, as at 16a, to receive the brake beam 10. The clevis block 16 is also provided with flanges 16b which engage the edges of the straps 11a and 11b. The straps 11a and 11b are slotted as at 11c to receive a bolt 17 which extends through aligned apertures in the clevis block 16 and the brake beam 10.

The right ends of the straps 11a and 11b, as they appear in the drawings, are connected to the brake beam 9 by means of a manually adjustable mechanism provided for the purpose of taking up slack in the rigging. A block 18 is attached by means of a bolt 19 to the right ends of the straps 11a and 11b. The block 18 is adjustably connected in any suitable manner to a rod 20 which extends through it and which is attached to a clevis block 21 generally similar to the clevis block 16. Clevis block 21 is slotted at 21a to receive the brake beam 9. The clevis block 21 is also provided with flanges 21b for engaging the sides of the straps 11a and 11b. The straps 11a and 11b are slotted as at 11d to receive a bolt 22 which passes through aligned apertures in the clevis block 21 and in the brake beam 9.

The cylinder of the hydraulic motor 13 receives hydraulic fluid under pressure through a flexible conduit 23 connected to a rigid pipe 23a attached as by welding to the brake beam 10. The pipe 23a is in turn connected through a flexible pipe 23b to the lower end of a rigid pipe 24 which is attached to and extends lengthwise of the brake hanger lever 7. The upper end of pipe 24 is connected through a flexible conduit 25 to pipe 26 leading to a source of hydraulic fluid under pressure. As herein shown, this source is a hydraulic ram 27 operated by a pneumatic cylinder 28. The ram 27 receives hydraulic fluid from a reservoir 29 through a conduit 30 controlled by a check valve 31 which is pneumatically operated by pressure from the same source which supplies cylinder 28. For a more complete description of the pneumatic cylinder 28 and the ram 27 and their associated parts, reference is made to my copending application for Letters Patent of the United States Serial No. 34,609, filed June 23, 1948, for Brake Mechanism.

Operation of Figs. 1 and 2

When it is desired to apply the brakes, air under pressure is admitted to cylinder 28 and to check valve 31. The check valve 31 serves to close the path of fluid flow between the ram 27 and the reservoir 29. The pneumatic cylinder 28 builds up a high hydraulic pressure in the ram 27, which is communicated through conduits 26, 25, 24, and 23 to the several hydraulic motors 13 associated with the respective wheels. This application of pressure to motor 13 moves the piston rod 15 to the right as it appears in Figs. 1 and 2, thereby moving clevis block 16 and brake beam 10 to the right and applying the brake shoe 3 to the wheel 1. At the same time, the reactive force on the motor 13 carries the trunnions 13a and the tension rod 11 to the left, thereby moving brake beam 9 to the left and applying the brake shoe 2 to the wheel 1. It will be readily understood that no appreciable force can be exerted by either brake shoe on the wheel until the opposite shoe also engages the wheel, since the application of braking force by either shoe depends upon the presence of an opposite reactive force derived from the other shoe and transmitted through the motor 13.

When it is desired to release the brakes, the air pressure supplied to cylinder 28 is vented to atmosphere, whereupon the internal spring (not shown) in that cylinder operates the ram 27 to reduce the hydraulic pressure. thereby allowing the internal spring in motor 13 to move the brake shoes 2 and 3 in a brake releasing direction.

As the brake shoes become worn, the slack in the rigging may be adjusted by suitable adjusting mechanism (not shown) of any conventional form, which changes the position of block 18 with respect to rod 20.

Although a brake rigging for one wheel only is illustrated in Figs. 1 and 2, it will be readily understood that in a truck having more than one axle, each wheel will be provided with a brake rigging similar to that shown, and that all the hydraulic motors of the respective wheels will be connected to the hydraulic fluid supply conduit 26.

Figs. 3 and 4

In these figures there is shown a wheel 30 provided with a brake rigging including shoes 31 and 32. brakeheads 33 and 34, and brake hanger levers 35 and 36.

The lower ends of the hanger levers 35 and 36 are connected through straddle rods 37 and 38. The right ends of the straddle rods 37 and 38, as they appear in the drawings, are apertured to receive studs 39 attached to the casing of a hydraulic motor 40, generally similar to the hydraulic motor 13 of Figs. 1 and 2.

The motor 40 operates a piston rod 41, to which is connected a clevis block 42 apertured as at 42a to receive the lower end of hanger lever 35. The clevis block 42 is also provided with flanges 42b for engaging the sides of the straddle rods 38 and 37. The straddle rods 37 and 38 are slotted, as at 37a, to receive a bolt 43 which extends through suitable apertures in the clevis block 42 and in the lower end of hanger lever 35.

The left ends of straddle rods 37 and 38, as they appear in the drawings, are apertured to receive studs 44 which are fixed in the casing of a hydraulic slack adjuster 45. The particular form of hydraulic slack adjuster used herein forms no part of my present invention. Any suitable form of slack adjuster may be used. For a disclosure of a similar type of pneumatic slack adjuster, reference is made to Letters Patent of the United States No. 1,947,675, granted to Francis E. Schwentler on February 20, 1934, for Truck Brake Rigging.

The slack adjuster 45 operates a piston rod 46 carrying a clevis block 47 generally similar to the clevis block 42. The clevis block 47 is apertured as at 47a to receive the lower end of brake hanger lever 36. The block 47 is provided with flanges 47b for engaging the sides of the straddle rods 37 and 38. The straddle rods are slotted, as at 37b, to receive a bolt 48 which extends through suitable aligned apertures in the clevis block 47 and in the lower end of hanger lever 36.

Hydraulic fluid is supplied to the hydraulic motor 40 through a flexible conduit 49 connected to the lower end of a rigid conduit 50 which is attached to and extends lengthwise of the brake hanger lever 35. The upper end of pipe 50 is connected to a suitable source of hydraulic fluid such as that shown in Fig. 1.

The operation of the rigging shown in Figs. 3 and 4 is generally similar to that of the rigging shown in Figs. 1 and 2, and a detailed discussion is believed to be unnecessary here. The operation of the hydraulic slack adjuster 45 may, however, be briefly mentioned. When the piston in the hydraulic motor 40 travels beyond a predetermined point, then it uncovers a port leading through a flexible conduit 51 to a pipe 52 rigidly attached to the straddle rod 38, and thence through a flexible conduit 53 to the hydraulic slack adjuster 45. The slack adjuster then operates to adjust the position of the lower end of hanger lever 36 with respect to the left ends of the straddle rods 37 and 38, in such a direction that the slack adjusting port in the hydraulic motor 40 is not uncovered on the next operation of the brakes. In this way, the slack adjuster operates to compensate for wear at the brake shoes and in other parts of the rigging, so that the piston travel in the motor 40 does not become excessive because of such wear. The operation of the slack adjuster 45, per se, is generally similar to that of the pneumatic slack adjuster described in the Schwentler Patent No. 1,947,675, previously referred to.

It should be noted that in both modifications of my invention, the flexible conduits in the hydraulic piston are made as short as possible. For the most part, the conduits consist of rigid pipes which are attached to parts of the rigging, and are thus protected against deterioration due to vibration.

Although I have herein shown and described only two forms of brake mechanism embodying my invention, it is understood that various changes and modifications may be made therein within the scope of the appended claims without departing from the spirit and scope of my invention.

Having thus described my invention, what I claim is:

1. Brake mechanism for a railway vehicle wheel, comprising two brake shoes located on opposite sides of the wheel, a brakehead for each shoe, a brake hanger for supporting each brakehead, a tension rod extending parallel to the wheel, means including a fluid pressure motor for operatively connecting one end of the rod to one of the brakeheads and effective upon the application of fluid pressure to the motor to produce relative motion of the rod and said one brakehead, and means including a slack adjuster on said rod for operatively connecting the other end of the rod to the other brakehead.

2. Brake mechanism for a railway vehicle wheel, comprising two brake shoes located on opposite sides of the wheel, a brakehead for each shoe, a brake hanger lever for supporting each brakehead and extending downwardly below the brakehead, a pair of straddle rods located respectively inboard and outboard of the wheel and extending parallel thereto, means including a fluid pressure motor for operatively connecting the lower end of one hanger to the adjacent ends of the straddle rods and effective upon the application of fluid pressure to the motor to produce relative motion of the rods and said one hanger, and means including a slack adjuster on said rods for connecting the lower end of the other hanger to the other ends of the straddle rods.

3. Brake mechanism for a pair of railway vehicle wheels located at opposite ends of an axle, comprising two brake shoes located on opposite sides of each wheel, a brakehead for each shoe, a brake hanger lever for supporting each brakehead and extending downwardly below the brakehead, a pair of brake beams, each connecting the lower end of one hanger lever with the lower end of the corresponding hanger lever on the opposite wheel, a pair of pull rods located at the opposite sides of the axle and extending parallel to the wheels, a pair of fluid pressure motors, each operatively connecting one end of a pull rod to the adjacent brake beam, and a pair of slack adjusters, each operatively connecting the opposite end of a pull rod to the other brake beam.

4. A clasp brake mechanism for a railway vehicle wheel, comprising a pair of oppositely disposed links having means for frictionally retarding the wheel, a fluid motor supported by one link, a slack adjuster supported by the other link, and means including said motor and said slack adjuster operatively connecting said links in such manner that actuation of the fluid motor moves both links to wheel retarding positions and adjustment of the slack adjuster takes up slack between the motor and both wheel retarding means.

5. A clasp brake mechanism for a railway vehicle wheel, comprising hanger levers disposed at opposite sides of the wheel, means operatively connected to the hanger levers for frictionally retarding the wheel, a fluid motor operatively connected to the free end of one hanger lever, a slack adjuster operatively connected to the free end of the other hanger lever, and means including said motor and said slack adjuster for connecting the free ends of said levers in such manner that actuation of the fluid motor operates said frictional retarding means and adjustment of the slack adjuster takes up slack between the motor and the retarding means.

6. A clasp brake mechanism for a railway vehicle wheel, comprising hanger levers disposed at opposite sides of the wheel, means operatively connected to the hanger levers for frictionally retarding the wheel, a fluid motor comprising two relatively movable elements, a connection between one movable element and the free end of one hanger lever, a slack adjuster comprising two relatively adjustable elements, a connection between one adjustable element and the free end of the other hanger lever, and a pull rod connected at one end to the other movable element and at its opposite end to the other adjustable element, so that actuation of the motor moves both levers to wheel retarding positions and adjustment of the slack adjuster takes up slack between the motor and the wheel retarding means.

THOMAS R. McGOWAN.

REFERENCES CITED

The following references are of record in the file of this patent:

UNITED STATES PATENTS

| Number | Name | Date |
|---|---|---|
| 2,273,634 | Frede | Feb. 17, 1942 |
| 2,273,635 | Frede | Feb. 17, 1942 |
| 2,431,579 | Mueller | Nov. 25, 1947 |